United States Patent [19]

Long et al.

[11] Patent Number: 4,800,399

[45] Date of Patent: Jan. 24, 1989

[54] PULSED CONSTANT CURRENT SOURCE FOR CONTINUOUS TONE RESISTIVE RIBBON PRINTERS

[75] Inventors: Michael E. Long, Fairport; David A. Johnson, Rochester, both of N.Y.

[73] Assignee: Eastman Kodak Company, Rochester, N.Y.

[21] Appl. No.: 44,622

[22] Filed: May 1, 1987

[51] Int. Cl.$^4$ .............................. G01D 15/10

[52] U.S. Cl. .............................. 346/76 PH; 400/120

[58] Field of Search .............. 346/1.1, 76 R, 76 PH; 219/216 PH, 216; 400/120, 120 PH

[56] References Cited

U.S. PATENT DOCUMENTS 4,434,356 2/1984 Craig et al. .................... 346/76 PH 4,558,328 12/1985 Takanashi et al. ............ 346/76 PH 4,621,271 11/1986 Brownstein .................... 346/76 PH

OTHER PUBLICATIONS

IBM Technical Bulletin, vol. 22, No. 2, 07/79, "Constant Current Resistive Ribbon Print Head Array Drive Scheme."

*Primary Examiner*—E. A. Goldberg

*Assistant Examiner*—Huan Tran

*Attorney, Agent, or Firm*—Raymond L. Owens

[57] ABSTRACT

A pulsed constant current circuit is disclosed for each electrode of a resistive ribbon thermal printer. The circuit is energized for a predetermined time and provides a constant current pulse through the electrode to the resistive ribbon to cause a predetermined amount of dye to transfer from the ribbon to thereby provide a continuous tone print.

5 Claims, 2 Drawing Sheets

PULSED CONSTANT CURRENT SOURCE FOR CONTINUOUS TONE RESISTIVE RIBBON PRINTERS

FIELD OF THE INVENTION

The present invention relates to resistive ribbon thermal printers, and more particularly, to current sources for providing current to electrodes in print heads of a resistive ribbon printer.

BACKGROUND OF THE INVENTION

In one type of thermal printer which prints colored images, a carrier contains a repeating series of spaced frames of different colored heat transferable dyes. In such apparatus, the carrier is disposed between a receiver, such as coated paper, and a print head formed of, for example, a plurality of individual heating elements. When a particular heating element is energized, it is heated and causes dye from the carrier to transfer to the receiver. The density or darkness of the printed color dye is a function of the energy delivered from the heating element to the carrier.

Thermal dye transfer printers offer the advantage of true "continuous tone" dye density transfer. This result is obtained by varying the energy applied to each heating element, yielding a variable dye density image pixel on the receiver.

One way to provide energy to the heating elements is to provide a constant current source for each heating element. The amount of energy delivered is a function of the time the current is applied to a heating element. Such an arrangement is called pulse width modulation.

Another type of thermal printer uses resistive ribbons. In U.S. Pat. No. 4,434,356 assigned to the IBM Corporation, a circuit is described which provides constant current to a resistive ribbon printer. Resistive ribbon printing technology uses a ribbon including a metal conducting layer and a dye layer containing dye to be transferred to a receiver. Current is supplied to the resistive ribbon by an electrode or array of electrodes and returns to ground via the conductive layer. The electric current is converted to heat through the resistive heating of the ribbon. The heat causes dye to transfer to a receiver.

This circuit is used in an application which is essentially a binary process. That is, the desired effect is to either transfer dye or ink or not to transfer dye. Up to the present invention, resistive ribbon technology has not been used to provide continuous tone prints because of the requirement that variable, precisely controlled, heat levels be applied to a transferable dye.

SUMMARY OF THE INVENTION

Accordingly, it is an object of this invention to provide an improved circuit which can be used in resistive ribbon thermal printers to provide continuous tone prints.

This object is achieved in a resistive ribbon thermal printer which provides constant current pulses. In the printer there is included a print head having a plurality of electrodes which supply current to a resistive ribbon having a sublimable dye layer which in response to different heat levels causes variable amounts of dye to transfer to a receiver, the improvement comprising: pulsed constant current means effective in a first condition to provide a constant current pulse to a selected electrode, and effective in a second condition to prevent current from being supplied to such electrode; and control means for causing said constant current means to be effective in its first condition for a selected time to produce a constant current pulse to cause a predetermined amount of dye to transfer.

A feature of this invention is that it is particularly suitable for use with sublimable dyes.

Another feature of this invention is the application of constant current pulses to provide the desired heat level.

DESCRIPTION OF THE PREFERRED EMBODIMENT

Figure 1:
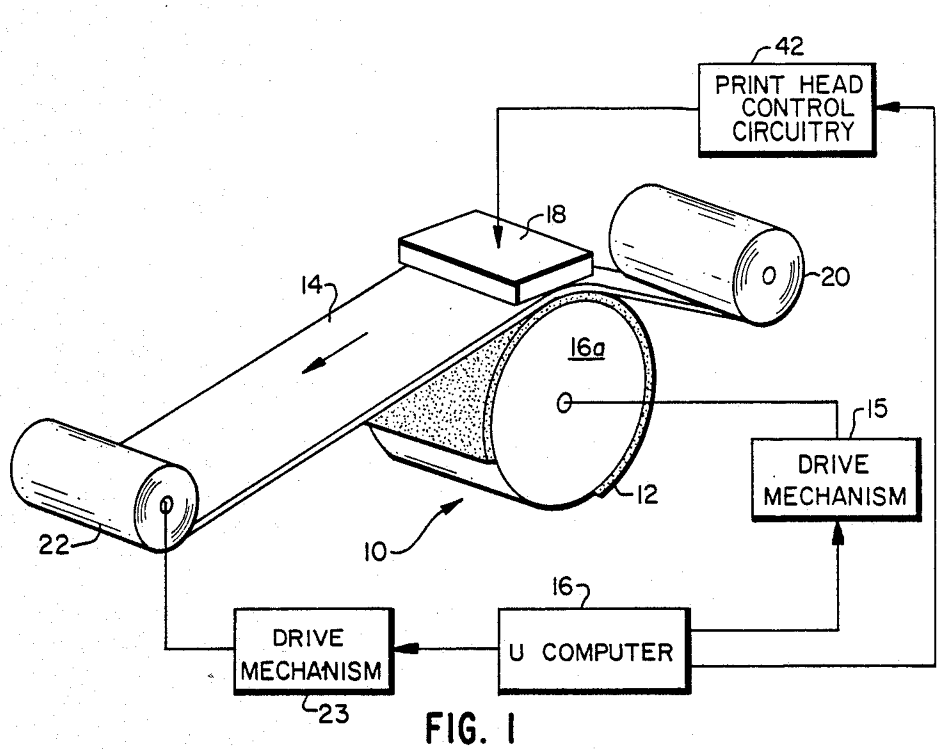
FIG. 1 is a schematic of a resistive ribbon thermal printer apparatus which can be employed to make colored image in a receiver in accordance with the invention.

To facilitate an understanding of the present invention, reference is first made to FIG. 1 which shows a typical section of a resistive ribbon carrier 14 which may be used in the thermal printer 10 shown in FIG. 1. The carrier 14 comprises a strip having a clear leader portion followed by a repeating series of conventional colored dye frames (not shown). The dye frames are spaced and each series includes in sequence yellow, magenta and cyan dye frames. A black frame can also used.

Figure 2:
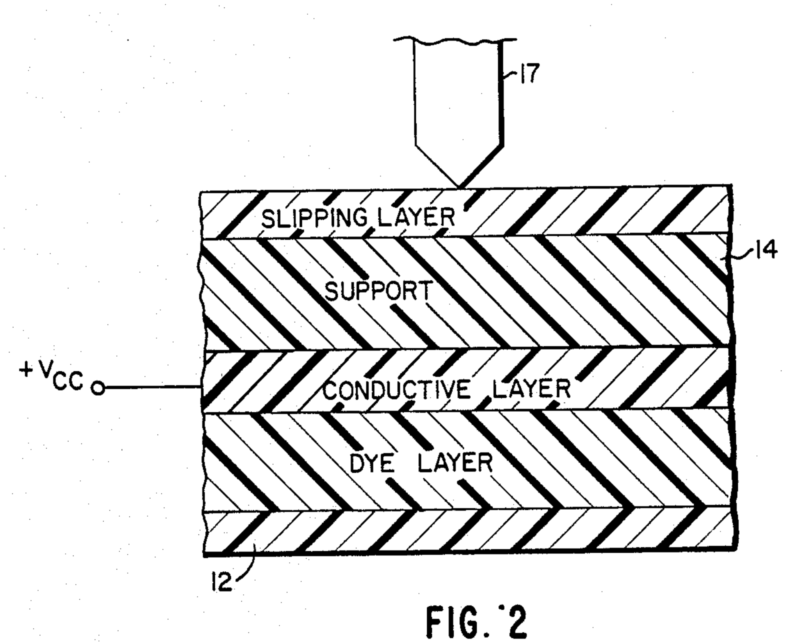
FIG. 2 shows a cross-section of a typical resistive ribbon carrier which can be used by the apparatus shown in FIG. 1.

FIG. 2 shows in cross-section the resistive ribbon carrier 14. The carrier 14 includes a support which can be made of a mixture of carbon and polycarbonate. On one surface of the support is a slipping layer which bears against the electrodes of a print head in the printer 10 of FIG. 1. On the other surface of the support is a conductive layer which can be made of aluminum. A current pulse from the electrode 17 passes through the slipping, support and conductive layer and returns to a current source $V_{CC}$ via the conductive layer. In this process, heat is generated and transferred to the dye layer. Dye is sublimed from this dye layer into a receiver member 12.

Referring again to FIG. 1 where the receiver member 12, in the form of a sheet, is secured to a rotatable drum 16*a* which is mechanically coupled to a drive mechanism 15. It will be understood that the drive mechanism 15 continuously advances the drum 16 and receiver sheet 12 along a path past the stationary print head 18 during a cycle for addressing electrodes of the print head. Print head 18 has a plurality of heating electrodes 17 which contact the carrier. Only one electrode 17 is shown in FIG. 2. The resistance of the carrier 14 to current provided by an electrode is labeled $R_L$ in FIG. 3. Each electrode 17 presses against the slipping layer of the carrier member 14 and forces the carrier member against the receiver member 12. The carrier member 14 is driven along a path from a supply roller 20 onto a take-up roller 22 by a drive mechanism 23 coupled to the take-up roller 22. The drive mechanisms 15 and 23 each include motors which respectively continuously advance the carrier and the receiver relative to the electrodes of the print head as the electrodes are selectively energized with constant current pulses.

Figure 3:
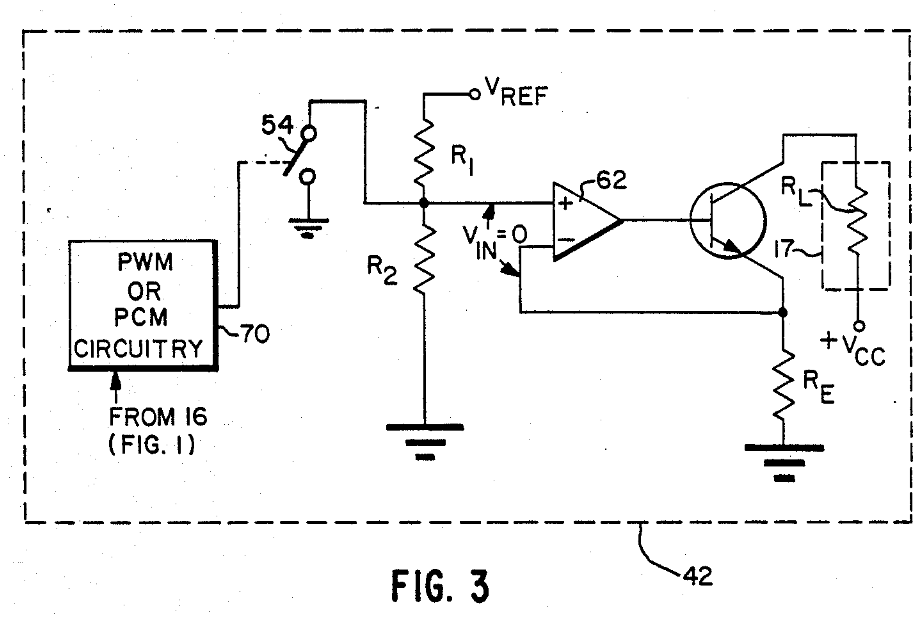
FIG. 3 is a schematic of a constant current circuit which can operate an electrode of the print head of FIG. 1 in accordance with the invention.

The microcomputer 16 controls the timing of the energization of each electrode via PCM or PWM circuitry 70, by opening and closing a switch 54 in a circuit 42 shown in FIG. 3. During printing, as the members 12 and 14 are moved, dye image pixels are formed in the receiver member 12. As noted above, these members are moved continuously along paths relative to the print head during the printing operation of the mechanisms 15 and 23.

The carrier member 14 is formed with a repeating series of thermally transferably (sublimable) dye frames. Each series may include frames of yellow, magenta and cyan dye frames. The sequence of yellow, magenta and cyan is repeated. A single series of frames is used to print one colored image in the receiver member 12. In the preferred embodiment, the sublimable dye is a material in which the amount of dye which transfers from the carrier to a receiver is in response to the heat level produced by the flow of current applied by the individual electrodes of the print head 18.

Any dye can be used in the dye layer provided it is transferable to the dye image-receiving layer of the dye-receiving element of the invention by the action of heat. Especially good results have been obtained with sublimable dyes. Examples of sublimable dyes include anthraquinone dyes, e.g. Sumikalon Violet RS ® (product of Sumitomo Chemical Co., Ltd.), Dianix Fast Violet 3R-FS ® (product of Mitsubishi Chemical Industries, Ltd.), and Kayalon Polyol Brilliant Blue N-BGM ® and KST Black 146 ® (products of Nippon Kayaku Co., Ltd.), azo dyes such as Kayalon Polyol Brilliant Blue BM ®, Kayalon Polyol Dark blue 2BM ®, and KST Black KR ® (products of Nippon Kayaku Co., Ltd.). Sumickaron Diazo Black 5G ® (product of Sumitomo Chemical Co., Ltd.), and Miktazol Black 5GH ® (product of Mitsui Toatsu Chemicals, Inc.); direct dyes such as Direct Dark Green B ® (product of Mitsubishi Chemical Industries, Ltd.) and Direct Brown M ® and Direct Fast Black D ® (products of Nippon Kayaku Co., Ltd.); acid dyes such as Kayanol Milling Cyanine 5 ® (product of Nippon Kayaku Co., Ltd.); basic dyes such as Sumicacryl Blue 6G ® (product of Sumitomo Chemical Co., Ltd.), and Aizen Malachite Green ® (product of Hodogaya Chemical Co., Ltd.); or any of the dyes disclosed in U.S. Pat. No. 4,541,830, the disclosure of which is hereby incorporated by reference. The above dyes may be employed singly or in combination to obtain a monochrome. The dyes may be used at a coverage of from about 0.05 to about 1 g/m$^2$ and are preferably hydrophobic.

In FIG. 3, we see circuit 42 for energizing and de-energizing a current pulse through the resistive ribbon carrier represented by the load $R_L$. A network includes resistors $R_1$ and $R_2$, respectively. A lead at the electrical junction of these resistors is connected to the non-inverting input of operational amplifier 62 to provide a reference operating point. A pulse width modulator (PWM) or pulse count modulator (PCM) circuitry 70 is actuated by the microcomputer 16 and opens and closes the switch 54 thereby producing constant current pulses. When open, the resistors $R_1$ and $R_2$ act as a voltage divider, and the stable voltage applied to the non-inverting input is:

$$\frac{R_2}{R_1 + R_2} \times V_{REF}.$$

Assuming idealized conditions, the voltage applied across $R_E$ is also $$\frac{R_2}{R_1 + R_2} \times V_{REF}.$$

Consequently, the collector current is $$\frac{R_2}{R_1 + R_2} \times \frac{V_{REF}}{R_E}$$

assuming a negligible base transistor current. When the switch 54 is closed by a pulse from circuit 70, ground is applied to the non-inverting input of the operational amplifier, the transistor's collector current is reduced to zero, and the current pulse through the load $R_L$ is de-energized.

Using a pulse width modulation scheme, the amount of dye transferred is controlled by adjusting the width of a constant current pulse, that is the amount of time the switch 54 is open during each printing cycle.

A pulse count modulation scheme controls the dye density transferred by an individual electrode by closing the switch 54 a variable number of times during a printing cycle. For example, if 256 pulses were required for a maximum density, only 130 constant current pulses would produce a mid-level density.

The invention has been described in detail with particular reference to a certain preferred embodiment thereof, but it will be understood that variations and modifications can be effected within the spirit and scope of the invention.

We claim:

1. In a continuous density thermal printer including a print head having a plurality of electrodes which supply current to a resistive ribbon having a dye layer with sublimable dye which in response to different heat levels causes variable amounts of dye to transfer to a receiver, the improvement comprising:

(a) a plurality of constant current means each effective in a first condition to provide constant current to a selected electrode which supplies such current to the resistive ribbon which responds by producing heat and effective in a second condition to prevent current from being supplied to such electrode; and (b) control means for causing each said constant current means to be effective in its first condition for a selected time to produce constant current to cause a predetermined amount of dye to transfer to produce a continuous tone dye image.

2. The thermal printer system of claim 1, wherein said constant current means comprises:

(i) a transistor having emitter, base and collector electrodes, the collector being connected to a source of potential and a print head electrode;

(ii) a resistor $R_E$ connected to the emitter electrode; and (iii) an operational amplifier having its output connected to the base electrode and its inverting electrode connected at the electrical junction of the emitter and resistor $R_E$;

(iv) a voltage divider network; and (v) control means for selectively connecting a ground potential and a positive potential from the divider network to the non-inverting input of the operational amplifier to de-energize and energize with a constant current pulse its electrode, respectively.

3. The invention as set forth in claim 2, wherein said voltage divider network includes two resistors connected in series with their electrical junction being connected to the non-inverting input of such operational amplifier, and switch means effective to selectively connect said junction to a ground potential and a positive reference potential.

4. The invention as set forth in claim 1 wherein each said constant current means includes pulse width modulation circuitry and said control means includes a microcomputer for controlling such pulse width circuitry to cause such circuitry to produce a constant current pulse having a duration selected to cause a predetermined amount of dye to transfer to a receiver.

5. The invention as set forth in claim 1 wherein each said constant current means includes pulse count modulation circuitry for producing constant current pulses and said control means includes a microcomputer for controlling the number of such constant current pulses to cause a predetermined amount of dye to transfer to a receiver.

* * * * *